United States Patent
Geschwender et al.

(10) Patent No.: US 7,337,119 B1
(45) Date of Patent: Feb. 26, 2008

(54) SYSTEM AND METHOD FOR DETECTING PURCHASING CARD FRAUD

(75) Inventors: Julie A. Geschwender, Omaha, NE (US); Michele Murphy-Houser, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 743 days.

(21) Appl. No.: 09/425,471

(22) Filed: Oct. 22, 1999

Related U.S. Application Data

(60) Provisional application No. 60/105,611, filed on Oct. 26, 1998.

(51) Int. Cl.
*G06Q 99/00* (2006.01)

(52) U.S. Cl. ............................................. 705/1; 705/44
(58) Field of Classification Search .................... 705/1, 705/14, 35, 38
See application file for complete search history.

(56) References Cited

U.S. PATENT DOCUMENTS

| | | | |
|---|---|---|---|
| 5,239,462 A | 8/1993 | Jones et al. | |
| 5,774,882 A | 6/1998 | Keen et al. | |
| 5,819,226 A | 10/1998 | Gopinathan et al. | |

OTHER PUBLICATIONS

Schott, et al., "The plastic thief: preventing credit card fraud", Credit Union Executive, v35, n3, p. 16(8), May 15, 1995, Dialog File 148, 0794706.
Grafton, David; "Analysing Customers With Behavioural Modelling"; v17n6, pp. 27-31 1996 ISSN: 0143-5329 JRNL Code: CRT.
"Five Ways To Reduce Risk With Neural Networks"; Credit Risk Management Report; Sep. 27, 1993; V. 3 No. 19; Publisher: Phillips Business Information, Inc.
International Search Report Mar. 2, 2000.
Grafton, David; "Analysing Customers With Behavorial Modelling"; v17n6, pp. 27-31 1996 ISSN: 0143-5329 Jrnl Code: CRT.
"Five Ways To Reduce Risk With Neural Networks"; Credit Risk Management Report; Sep. 27, 1993; v. 3 No. 19; Publisher: Phillips Business Information, Inc.

*Primary Examiner*—Frantzy Poinvil
(74) *Attorney, Agent, or Firm*—Brooks Kushman P.C.

(57) ABSTRACT

A method and system for detecting purchasing card fraud during every aspect of a purchasing card life cycle is disclosed. A central fraud database is created for receiving potential fraud or "high risk" information. The fraudulent information may include, fraudulent customer names, addresses, phone numbers, places of employment, criminal histories, and other personal information. The central fraud database receives information from a variety of sources including but not limited to client fraud files, law enforcement files, and USPS databases. After a contact event has a occurred the fraud database is scanned for a match between the contact event information and the contents of the fraud database. If a fraud match occurs the system sends a fraud alert to the client, including a scorecard. The client is given options to respond to the contact event, such as suspending purchasing card generation.

27 Claims, 4 Drawing Sheets

SYSTEM AND METHOD FOR DETECTING PURCHASING CARD FRAUD

CROSS-REFERENCE TO RELATED APPLICATIONS

This application claims the benefit of U.S. Provisional Application No. 60/105,611, filed on Oct. 26, 1998 and entitled "System and Method For Detecting Credit Card Fraud".

TECHNICAL FIELD

This invention relates to a system and method for detecting and preventing purchasing card fraud during all phases of a purchasing card life cycle.

BACKGROUND ART

Roughly half a billion transactions with significant, but preventable, fraud potential occur in the United States each year. Purchasing card contact events that can lead to fraudulent occurrences include application processing, card activation, usage, such as mail and phone ordering, and maintenance events, such as address or other information changes. It is estimated that the total cost of fraud is $1.3 million for every one million gross active accounts, or $1.34 in fraud loss per gross active account (Sources: VISA/MC, Credit Card Prevention Sourcebook).

A large portion of this fraud could effectively be addressed though improved identification of known fraudulent names, fraudulent addresses, fraudulent phone numbers, fraudulent social security numbers, and other fraudulent personal information. In fact, a large number of fraud cases are typically perpetrated by repeat offenders or organized rings.

Current tools to combat repeat and organized fraud are still underdeveloped. While there are a myriad of sources for fraud-related information, the various sources focus on differing pieces of personal data and return fraudulent alerts in non-standard formats. In addition to the lack of uniformity of the alert information, current systems lack real time, "near" real time, or via batch functionality. Furthermore, no single comprehensive source exists that is capable of addressing fraud during the many stages of a purchasing card account.

DISCLOSURE OF INVENTION

Therefore, it is an object of the present invention to provide a system and method for facilitating fraud prevention and detection at all stages of a purchasing card life cycle, wherein purchasing cards are defined as credit cards, debit cards, "Smart" cards (having IC chips), retail cards (such as gas cards), and the like.

It is another object of the present invention to provide a single comprehensive database of standardized fraud data from various contributory sources.

It is still another object of the present invention to allow clients to reduce manual processes for fraud detection.

In accordance with these and other objects, the present invention provides a method and system for detecting purchasing card fraud during every aspect of a purchasing card life cycle. A central fraud database is created for receiving known fraudulent or "high risk" personal information. The personal information may include, the fraudulent name, fraudulent addresses, fraudulent phone numbers, fraudulent places of employment, criminal history, and other personal information for example. The central fraud database receives information from a variety of sources including but not limited to proprietary databases, client fraud files, law enforcement, and USPS databases. After a contact event has a occurred the fraud database is scanned for a match between the contact event information and the contents of the fraud database. If a possible fraud match occurs the system sends a fraud alert to the client or user of the database. The present invention has many advantages over the prior art for example the present invention has the capability to send fraud alerts in real time, "near" real time, or via batch to clients thus reducing or eliminating the damage caused by potential purchasing card fraud.

Thus in accordance with one aspect of the present invention, a method is provided for detecting purchasing card fraud during all phases of a purchasing card life cycle. The method includes obtaining contact event information from a client during a contact event, comparing the contact event information with information stored in a database, and sending a fraud alert to a client in real time, "near" real time, or via batch for communicating to the client that a potential fraud match has occurred. Thus the method allows for special handling of the contact event by the client or user of the database.

In accordance with another aspect of the present invention, a system for detecting purchasing card fraud during all phases of a purchasing card life cycle is provided. The system has a computer database for receiving contact event information from a client, computer software in communication with the computer database for comparing the contact event information with information stored in the database, and a communication network for sending a fraud alert to a client in real time, "near" real time, or via batch for informing the client that a potential fraud match has occurred.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

The present invention provides a system and method for facilitating fraud prevention and detection for all contact events during a purchasing card life cycle. Such contact events include 1) application processing; 2) card activation; 3) cardholder usage, including mail and telephone orders; and 4) maintenance events, such as name and address changes, PIN changes, plastic requests, and credit line increases.

Figure 1:
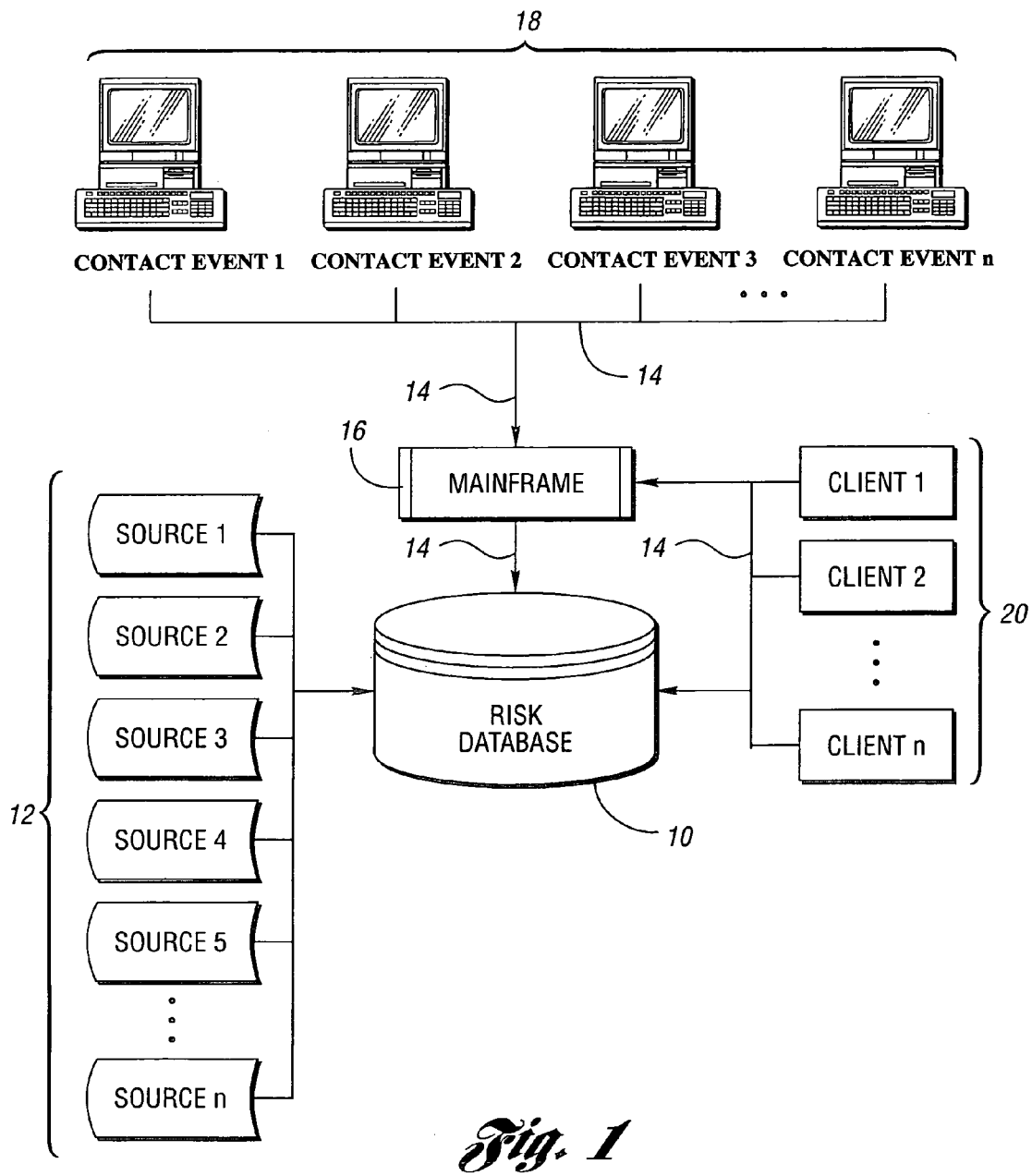
FIG. 1 is a schematic representation of a purchasing card fraud detection system designed in accordance with the present invention.

With reference to FIG. 1, the system of the present invention preferably includes a single, comprehensive risk database 10 for the detection of purchasing card fraud. The risk database 10 may include information from various sources 12, as will be described below. The risk database is preferably server-based and has connectivity, via a local area network 14 (LAN) or other network, to a mainframe 16. The mainframe 16 is provided for on-line transactions involving the various contact events 18 described above. Clients 20 are provided with connectivity to the risk database 10 for file transfer and general access, and are also provided connectivity to mainframe 16 (Graphical User Interface, dummy terminal or the like) for receipt of fraud alerts and queue information. An optional, more limited database (not shown) could be provided for non-contributors to the risk database. Preferably, a backup server is provided.

The system of the present invention possesses the technical functionality to pool data from multiple sources in multiple formats and to standardize reporting structure guidelines, enabling the risk database to function for many types of transactions or contact events 18. In addition, the system provides the ability to query in real time, "near" real time, or via batch with on-line interfaces to the mainframe transactions. Preferably, limited client 20 resources are required for access.

In a preferred embodiment, at the mainframe 16 level, a daily queue statistics report is developed at the client 20 level to identify all accounts that match the risk database 10, including the source of the data match. Furthermore, at the server level, reports are generated which track contributor statistics. In addition, reporting is developed to track client statistics on a query basis, such as by the number of record transactions queried against the risk database 10, or by the number of records with a data match.

Possible sources for the consortium fraud database 10 include client databases, credit card issuer databases, credit bureau databases, research and investigation fraud files, ANI risk databases, the U.S. Postal Service NRI database, Account Takeover modeling/scoring, the Social Security Administration, the Department of Motor Vehicles, Western Union, Telecheck, the American Business List, law enforcement, court and public information records, phone directories, and direct mail surveys.

From such sources, the available data includes, but is not limited to, 1) personal information, such as addresses, phone numbers, and social security numbers used in known frauds; 2) valid US addresses and their nature, i.e. residential, commercial, or vacant; 3) valid address/name combinations; 4) high risk zip codes; 5) public information, such as bankruptcy filings, tax liens, and civil judgments; and 6) consumer and purchase data.

The proposed data element structure within the risk database preferably includes at least the following:

1. Names of fraudulent or potentially fraudulent ("high risk") primary, secondary, and additional cardholders in the form of first name, last name, and middle initial.

2. Fraudulent or potentially fraudulent ("high risk") home and business addresses, including P.O. Box, city, state, and zip code.

3. Fraudulent or potentially fraudulent ("high risk") home and business telephone numbers.

4. Fraudulent or potentially fraudulent ("high risk") social security numbers of primary, secondary, and additional cardholders.

The risk database would act as a central repository for fraud data to be queried against by lenders and adjacent market users. Potential primary users or clients include bank card issuers, non-bank card issuers, potential card issuers, oil card issuers, merchants, and retailers. Possible secondary users include phone companies, DDA Account banks, and utility companies, among others.

Figure 2:
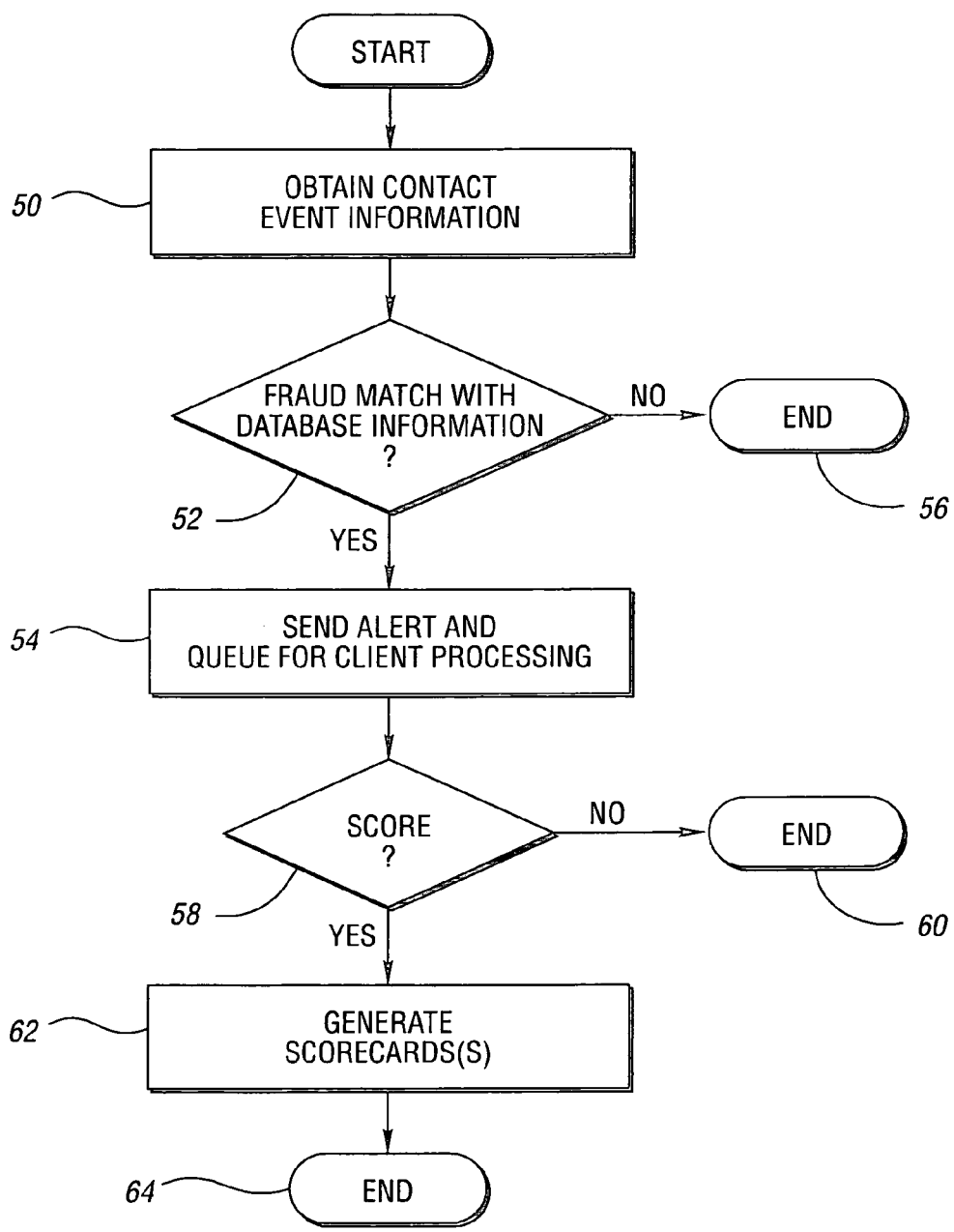
FIG. 2 is a flow diagram of a preferred method of detecting purchasing card fraud in accordance with the present invention.

The method of detecting potential purchasing card fraud of the present invention is outlined in the flow diagram of FIG. 2. The method includes obtaining contact event information at the mainframe 16, as represented by block 50. Comparing the contact event 18 information to fraud information stored in the risk database 10, as represented by block 52. If a match is found between the contact event information and the fraud information, the method further includes issuing an on-line alert to the client and queuing the information for manual review by the particular client, as represented by block 54. If a match does not occur client 20 is notified as such and communication with risk database 10 is concluded, as represented by block 56. Optionally, a fraud match may be scored, as represented by block 58 and as will be explained below. If a client 20 does not wish to receive a score then communication with the database is concluded, as represented by block 60. However, if a client has elected to receive a match score, a scorecard is generated and sent to the client 20, as represented by block 62 and then communication with risk database is terminated at block 64.

Within the system of the present invention, contact event 18 transactions are preferably structured to create automatic queries which compare account record data elements against the fraud information stored in the risk database. If a match is found between the account data and the fraud data, then an alert message is generated by the system in real time, "near" real time, or via batch to the queue. In addition, the account record is sent to an on-line queue to be monitored and/or manually worked by the client. Upon entry to the queue, the contact event transaction is suspended or placed on hold until manual follow-up is completed. The contact event information may for example be purged from the database.

An additional feature of the present invention is to offer clients 18 the option of having matched fraud data records "scored" to assist in the decisioning/actioning processes when a record is queued. Preferably, a generic suite of scorecards is provided, while also allowing client-defined scorecards to be developed and implemented. In a preferred embodiment, a scorecard is provided which predicts the likelihood of a fraudulent takeover of an existing, active, or inactive cardholder account.

Figure 3:
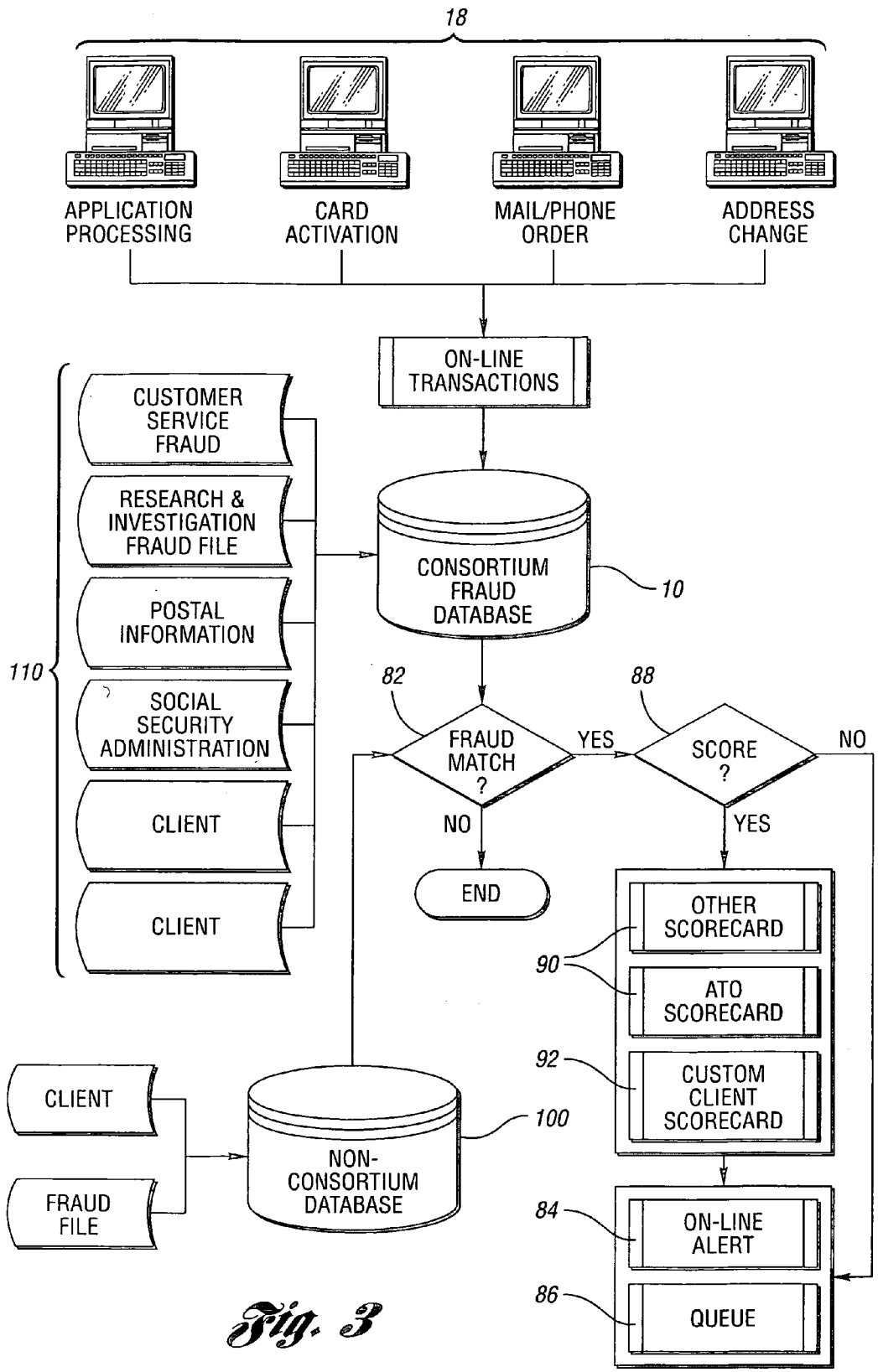
FIG. 3 is a flow diagram of a preferred fraud matching process.

The following attributes of the invention are thus possibly provided to facilitate fraud detection at all stages of a purchasing card life cycle:
Application Processing
Card Activation
Cardholder Usage/Maintenance
Other Transaction or Contact Events: Priority Non-Mons: PIN changes, plastic requests, credit line increases and changes to the account record.
The components of the invention are:
Consortium Data Warehouse
Fraud Scoring
Actioning (Alerts to On-Line Screens)
Queuing for Manual Review The Matching Process As shown in FIG. 3, selected non-monetary transactions may be structured to create queries which compare account record data elements against the Consortium Risk Database 10 of the invention. For example, during an account entry transaction 80 (application processing, card activation, mail/ phone order, address change, and the like) could automatically compare key application data elements against the Data Warehouse or Risk Database 10. If a match is found, as represented by block 82, between the account and the Data Warehouse, then an alert message 84 would be generated by the system real time, "near" real time, or via batch. In addition, the account record may be sent to an on-line queue 86 to be monitored and/or manually worked by the client. Upon entry to the queue, the non-monetary transactions would be suspended or placed on hold until manual follow up is completed. In the case of new account entries and batch-entered new accounts, the accounts may be built on the system, however, plastic generation would be suspended.

Information residing within the queue would include the account record information, the reason for the alert (i.e., potential fraudulent name, address, SSN, or phone number), and the contributing source of the matched data. This process will help to reduce responsibility/liability for data integrity.

Scoring of Matched Data

In further keeping with the invention, clients will be provided the option of having matched fraud data records "scored" to assist in the decisioning/actioning processes when a record is queued, as represented by block 88. This should provide business opportunities to build the appropriate scorecard logic. Accordingly, a generic suite of scorecards 90 may be implemented as well as client-defined scorecards 92.

Consortium Contributors

All consortium contributors will be allowed access to the entire data warehouse. Usage incentives may also be provided for "global" contributors. An example of a usage incentive may be reduced fees for accessing the fraud database. Other incentives may include partial to full access to information contained in the fraud database.

Non-Consortium User

A non-contributor to the consortium may be offered access to information that the database manager may have purchased or provided in a non-consortium database 100. Otherwise non-contributors may be restricted from information provided by "global" contributors to the Risk Consortium Database.

Summary of Benefits and Critical Needs Met

Provides a single source of uniform data from various contributor business sources;
Increases the effectiveness of fraud detection efforts;
Allows clients to reduce current manual processes for fraud identification and actioning;
Pools data across the client base to improve identification of repeat offenders.

Consortium Risk Data Warehouse

A consortium data warehouse contains data contributed from various business sources 110 including, but not limited to:

Clients;
Research and Investigation Fraud Files (Fraud App's and Account takeovers (type lost 3,5,8));
Customer Service Fraud File Database;
Card Activation ANI Risk Database;
Postal NRI Database (high risk Zip Codes);
Social Security Administration compromised SSN's;
International Association of Financial Crimes Investigators;
Cellular or Pay Phone Numbers/Numbers used fraudulently;
Western Union Fraud Data;
American Business List (prison addresses, hospitals, etc.);
Account takeover modeling/scoring;
Potential model for Skimmin;
American Correctional Association;
Lexis/Nexis.

Proposed Data Element Structure

Figure 4:
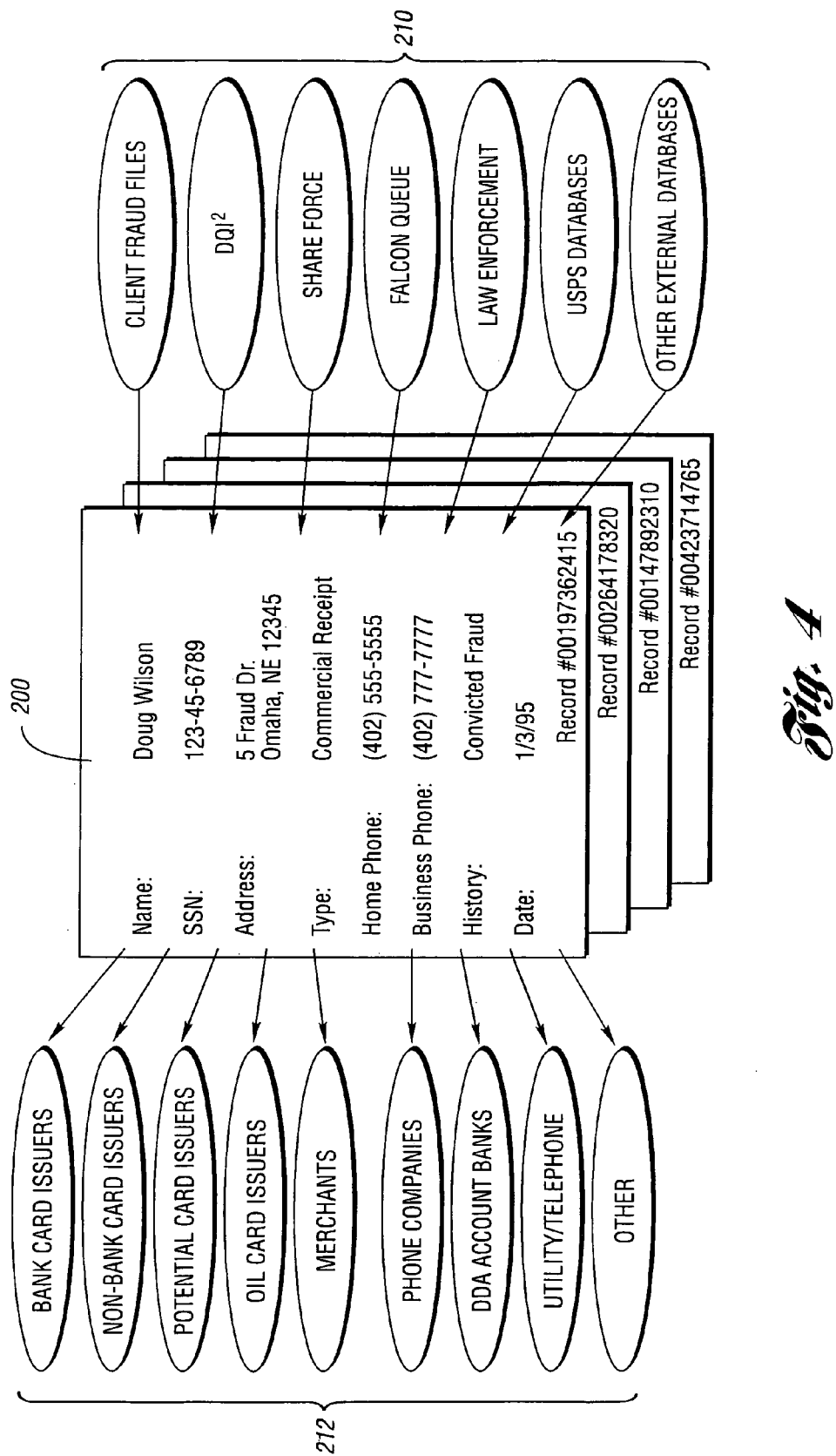
FIG. 4 is a schematic representation of a preferred fraud database architecture.

As depicted in FIG. 4, the data element structure 200 may include:

Name (Primary and Secondary and additional): First, Last, Middle Initial;
Address: Home, Business (including PO Box);
City;
State;
Zip Code;
Phone: Home, Business;
Social Security Number: Primary, Secondary;
High Risk Zip Codes (NRI data); and
Known fraudulent accounts determined by type lost.

Therefore, the system and method of the present invention provide a single source of uniform data from various contributor business sources 210, increase the effectiveness of fraud detection efforts, allow clients 212 to reduce current manual processes for fraud identification and actioning, and allow pooling of data across the client base to improve the identification of repeat offenders.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for detecting purchasing card fraud during all phases of a purchasing card life cycle, the method comprising:

obtaining contact event information from a client during a purchasing card application process;
comparing the contact event information with fraud information used in known frauds and stored in a database to determine if there is a fraud match between the contact event information and the fraud information; and
sending a fraud alert to the client if there is a fraud match between the contact event information and the fraud information.

2. The method of claim 1 wherein obtaining contact event information further comprises obtaining a customer's name, social security number, and address.

3. The method of claim 1 further comprising receiving the fraud information at the database from a plurality of fraud information sources.

4. The method of claim 1 wherein obtaining contact event information further comprises obtaining contact event information during a purchasing card application process.

5. The method of claim 1 wherein obtaining contact event information further comprises obtaining contact event information during a purchasing card activation process.

6. The method of claim 1 wherein obtaining contact event information further comprises obtaining contact event information during a purchasing card mail order transaction from a retail participant.

7. The method of claim 1 wherein obtaining contact event information further comprises obtaining contact event information during a purchasing card phone order transaction.

8. A method of claim 1 wherein obtaining contact event information further comprises obtaining contact event information during an address change process.

9. The method of claim 1 wherein sending a fraud alert further comprises sending an account record to an online queue to be monitored by the client.

10. The method of claim 9 wherein sending an account record further comprises suspending the contact event until a manual follow-up is completed.

11. The method of claim 1 further comprising scoring the fraud match to assist in the fraud determination process.

12. The method of claim 11 wherein scoring the fraud match further comprises predicting a likelihood of a fraudulent takeover of a cardholder account.

13. The method of claim 1 further comprising suspending purchasing card generation when a fraud match occurs.

14. The method of claim 1 wherein the sending step includes sending the fraud alert in real time.

15. The method of claim 1 wherein the sending step includes sending the fraud alert via batch.

16. A system for detecting purchasing card fraud during all phases of a purchasing card life cycle, the system comprising:
   a computer database for receiving contact event information from a client during a purchasing card application process;
   computer software in communication with the computer database for comparing the contact event information with fraud information used in known frauds and stored in the database to determine if there is a fraud match between the contact event information and the fraud information; and
   a communication network in communication with the database for sending a fraud alert to the client if there is a fraud match between the contact event information and the fraud information.

17. The system of claim 16 wherein the contact event information comprises a customer's name, social security number, and address.

18. The system of claim 16 wherein the fraud database is adapted to communicate with a plurality of fraud information sources.

19. The system of claim 16 wherein the computer database receives the contact event information during a purchasing card application process.

20. The system of claim 16 wherein the computer database receives the contact event information during a purchasing card activation process.

21. The system of claim 16 wherein the computer database receives the contact event information during a purchasing card mail order transaction from a retail participant.

22. The system of claim 16 wherein the computer database receives the contact event information during a purchasing card phone order transaction.

23. The system of claim 16 wherein the computer database receives the contact event information during an address change process.

24. The system of claim 16 wherein the fraud alert includes an account record which is sent to an online queue monitored by the client.

25. The system of claim 16 wherein the computer software is operative to score the fraud match to assist in the fraud determination process.

26. The system of claim 16 wherein the computer software and the communication network are operative to send the fraud alert in real time.

27. The system of claim 16 wherein the computer software and the communication network are operative to send the fraud alert via batch.

* * * * *